United States Patent
Ishikawa et al.

(10) Patent No.: US 11,894,570 B2
(45) Date of Patent: Feb. 6, 2024

(54) LOAD APPLICATOR AND POWER STORAGE APPARATUS

(71) Applicant: TOYOTA JIDOSHA KABUSHIKI KAISHA, Aichi-ken (JP)

(72) Inventors: Shotaro Ishikawa, Miyoshi (JP); Tatsuhiko Sasaki, Anjo (JP); Koichiro Kishi, Toyota (JP); Kenta Watanabe, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 51 days.

(21) Appl. No.: 17/579,601

(22) Filed: Jan. 20, 2022

(65) Prior Publication Data

US 2022/0238951 A1 Jul. 28, 2022

(30) Foreign Application Priority Data

Jan. 27, 2021 (JP) .................. 2021-010990

(51) Int. Cl.
*H01M 50/269* (2021.01)
*H01M 50/209* (2021.01)
(Continued)

(52) U.S. Cl.
CPC ....... *H01M 50/269* (2021.01); *H01M 50/209* (2021.01); *H01M 50/242* (2021.01);
(Continued)

(58) Field of Classification Search
CPC ....... H01M 50/20; H01M 50/204–209; H01M 50/233–238; H01M 50/242;
(Continued)

(56) References Cited

U.S. PATENT DOCUMENTS

2003/0017387 A1   1/2003  Marukawa et al.
2005/0277012 A1* 12/2005  Inagaki ............. H01M 8/247
                                                        429/511
(Continued)

FOREIGN PATENT DOCUMENTS

JP       06188023 A  *  7/1994  ............ H01M 8/247
JP      200336830 A      2/2003
(Continued)

OTHER PUBLICATIONS

Machine translation of Tamezane, JP 2010-009989. Originally published Jan. 14, 2010 (Year: 2010).*

(Continued)

*Primary Examiner* — Jonathan Crepeau
*Assistant Examiner* — Jacob Buchanan
(74) *Attorney, Agent, or Firm* — HAUPTMAN HAM, LLP

(57) ABSTRACT

A load applicator includes an elastic mechanism, a first member configured to move in accordance with contraction of power storage cells, a second member provided on a side opposite to the first member across the elastic mechanism, and a switching device. The elastic mechanism has a first form in which a first restraint load is applied to the power storage module when the power storage module expands by a first dimension, and a second form in which a second restraint load larger than the first restraint load is applied to the power storage module when the power storage module expands by the first dimension. The switching device performs an operation to switch from the first form to the second form in a case where a restraint load smaller than the first restraint load is applied to the power storage module when the power storage module expands by the first dimension.

11 Claims, 3 Drawing Sheets

(51) Int. Cl.
*H01M 50/289* (2021.01)
*H01M 50/242* (2021.01)
*H01M 50/291* (2021.01)
*H01M 50/293* (2021.01)

(52) U.S. Cl.
CPC ....... *H01M 50/289* (2021.01); *H01M 50/291* (2021.01); *H01M 50/293* (2021.01)

(58) Field of Classification Search
CPC ..... H01M 50/249; H01M 50/262–264; H01M 50/289–293; Y02E 60/10
See application file for complete search history.

(56) References Cited

U.S. PATENT DOCUMENTS

2017/0054119 A1* 2/2017 Lee ................. H01M 10/647
2020/0411819 A1* 12/2020 Seki ................. H01M 50/269

FOREIGN PATENT DOCUMENTS

| JP | 2010009989 A | * | 1/2010 | ............. Y02E 60/10 |
| JP | 2014175078 A | | 9/2014 | |
| JP | 2015230764 A | * | 12/2015 | ............. Y02E 60/10 |
| JP | 2019102323 A | * | 6/2019 | ............... Y02E 6/10 |
| KR | 20170038300 A | * | 4/2017 | ........ H01M 10/6544 |

OTHER PUBLICATIONS

Machine translation of Hwang, KR 2017-0038300. Originially published Apr. 7, 2017 (Year: 2017).*
Machine translation of Asai, JP 2019-102323. Originally published Jun. 24, 2019 (Year: 2019).*
Machine translation of Shinno, JP-06188023-A. Originally available Jul. 8, 1994. (Year: 1994).*
Machine translation of Sakai, JP-2015230764-A. Originally available Dec. 21, 2015. (Year: 2015).*

* cited by examiner

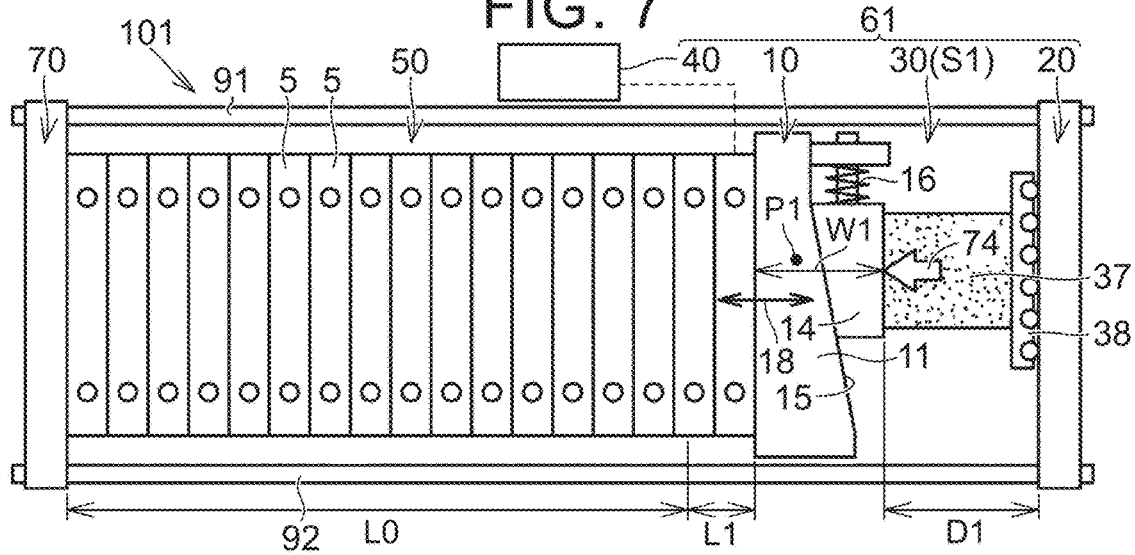
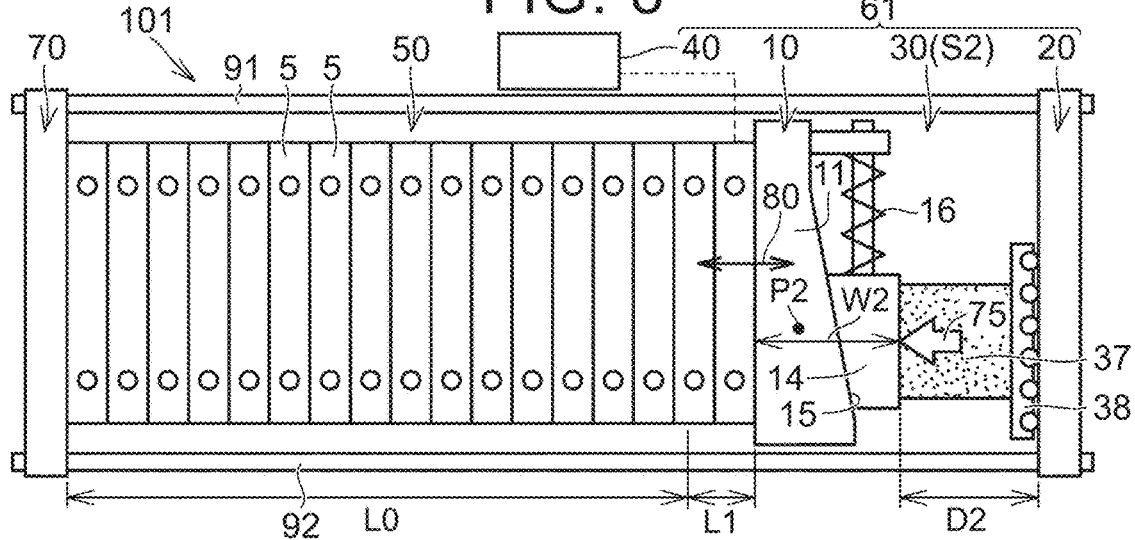
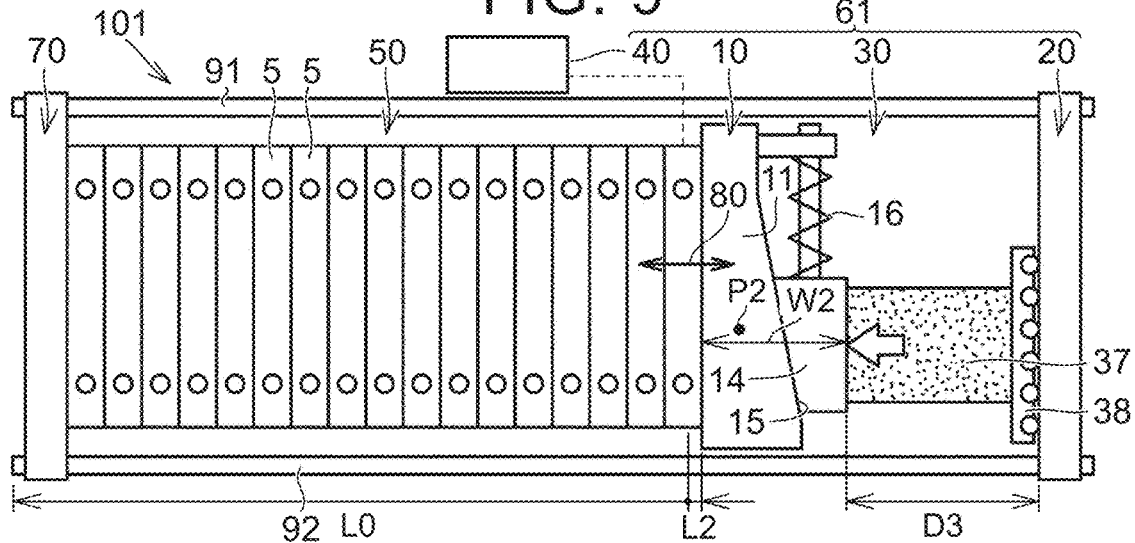

LOAD APPLICATOR AND POWER STORAGE APPARATUS

CROSS-REFERENCE TO RELATED APPLICATION

This application claims priority to Japanese Patent Application No. 2021-010990 filed on Jan. 27, 2021, incorporated herein by reference in its entirety.

BACKGROUND

1. Technical Field

This disclosure relates to a load applicator and a power storage apparatus.

2. Description of Related Art

As described in Japanese Unexamined Patent Application Publication No. 2014-175078 (JP 2014-175078 A) or Japanese Unexamined Patent Application Publication No. 2003-036830 (JP 2003-036830 A), a power storage module is configured such that a plurality of power storage cells is connected in series or in parallel to each other in an integrated manner. A power storage apparatus includes a power storage module and a load applicator configured to apply a restraint load to the power storage module. The load applicator is configured to apply an appropriate restraint load for a long period, so that it is possible to achieve performance stable for a long period in the power storage apparatus.

SUMMARY

When the load applicator is used for a long period, there is such a possibility that the load applicator cannot apply a necessary and sufficient load to the power storage module due to deterioration by aging, or the like, for example. For example, in a case where the power storage cells constituting the power storage module contract in one direction, a load to be applied from the load applicator to the power storage module in the one direction may become insufficient.

As measures to such a case, it is conceivable that the load applicator is configured to apply an excess load in advance to prepare for an amount to become insufficient. However, this can separately cause such a concern that an excessive load may be applied at an initial stage of use or this can separately cause such a necessity that the power storage module should have a strong structure sufficient to tolerate a large load.

An object of this disclosure is to provide a load applicator having a configuration that can apply an appropriate load to a target object for a long period as compared to the related art, and a power storage apparatus including such a load applicator.

A load applicator of this disclosure is a load applicator for applying a restrain load to a power storage module including a plurality of power storage cells. The load applicator includes an elastic mechanism, a first member, a second member, and a switching device. The first member is placed between the elastic mechanism and the power storage module in one direction. The first member is configured to move along the one direction along with contraction of the power storage cells. The second member is provided on a side in the one direction, the side being opposite to a side where the first member is placed, across the elastic mechanism. The elastic mechanism contracts so as to correspond to a distance between the first member and the second member in the one direction. The elastic mechanism applies a restraint load to the power storage module via the first member in accordance with a contraction amount of the elastic mechanism. The elastic mechanism has a first form in which a first restraint load is applied to the power storage module when the power storage module expands by a first dimension, and a second form in which a second restraint load larger than the first restraint load is applied to the power storage module when the power storage module expands by the first dimension. The switching device is configured to perform an operation to switch from the first form to the second form in a case where a restraint load smaller than the first restraint load is applied to the power storage module when the power storage module expands by the first dimension.

In the load applicator, the one direction may be a direction where the power storage cells are stacked.

In the load applicator, an elastic modulus of the elastic mechanism in a case where the second form is formed may be larger than an elastic modulus of the elastic mechanism in a case where the first form is formed.

In the load applicator, the elastic mechanism forming the first form may include a predetermined number of elastic bodies configured to apply a restraint load to the power storage module. The elastic mechanism forming the second form may include elastic bodies the number of which is greater than the predetermined number, the elastic bodies being configured to apply a restraint load to the power storage module.

In the load applicator, the first member may include a first part and a second part having a thickness thicker than a thickness of the first part in the one direction. In a state where the elastic mechanism forms the first form, the elastic mechanism may apply a restraint load to the power storage module via the first part of the first member. In a state where the elastic mechanism forms the second form, the elastic mechanism may apply a restraint load to the power storage module via the second part of the first member.

A power storage apparatus according to this disclosure includes a power storage module and the load applicator described above. The power storage module includes a plurality of power storage cells. In a state where respective SOC values of the power storage cells constituting the power storage module are set to values out of a predetermined range, the switching device performs switching from the first form to the second form.

With the above configuration, it is possible to achieve a load applicator having a configuration that can apply an appropriate load to a target object for a long period as compared to the related art, and a power storage apparatus including such a load applicator.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a plan view illustrating a load applicator and a power storage apparatus according to Embodiment 2 and illustrates a state where the elastic mechanism of the load applicator forms a first form;

FIG. 8 is a plan view illustrating the load applicator and the power storage apparatus according to Embodiment 2 and illustrates a state where the elastic mechanism of the load applicator forms a second form; and FIG. 9 is a plan view illustrating the load applicator and the power storage apparatus according to Embodiment 2 and illustrates a state where the switching device of the load applicator performs an operation to switch the elastic mechanism from the first form to the second form.

DETAILED DESCRIPTION OF EMBODIMENTS

Figure 1:
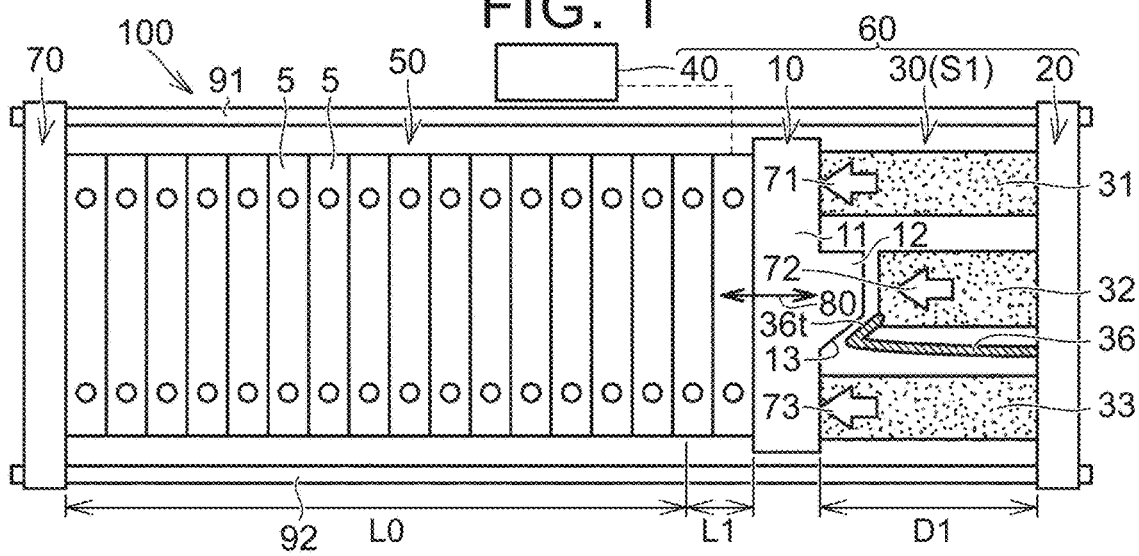
FIG. 1 is a plan view illustrating a load applicator and a power storage apparatus according to Embodiment 1 and illustrates a state where an elastic mechanism of the load applicator forms a first form.

The following describes embodiments of the present disclosure. In a case where a number, an amount, and the like are mentioned in the embodiments described below, the scope of this disclosure is not necessarily limited to the number, the amount, and the like, unless otherwise specified. Each constituent is not necessarily essential for this disclosure unless otherwise specified. The same reference numeral is assigned to the same component and its equivalent component, and a redundant description may not be repeated.

The absolute values of the dimensions (e.g., L0, L1, D1 illustrated in FIG. 1) of constituents illustrated in the drawings and relative ratios therebetween may not be necessarily illustrated faithfully as their actual values, and the dimensions may be exaggerated for convenience of the description.

Embodiment 1

Power Storage Apparatus 100

FIG. 1 is a plan view illustrating a load applicator 60 and a power storage apparatus 100 according to Embodiment 1. The power storage apparatus 100 includes a power storage module 50, the load applicator 60, an end plate 70, and restraining tools 91, 92. The power storage module 50 includes a plurality of power storage cells 5. An insulating member (not illustrated) is placed between two power storage cells 5 adjacent to each other, so that the two power storage cells 5 adjacent to each other are electrically insulated from each other.

The load applicator 60 applies a restraint load to the power storage module 50 in collaboration with the end plate 70 and the restraining tools 91, 92. More specifically, the load applicator 60 includes an elastic mechanism 30, a receiving member 10 (a first member), an end plate 20 (a second member), and a switching device 40.

The receiving member 10 is placed between the elastic mechanism 30 and the power storage module 50 in one direction 80 and moves along the one direction 80 along with contraction of one or more power storage cells 5. The end plate 20 is provided on a side, in the one direction 80, that is opposite to a side where the receiving member 10 is placed, across the elastic mechanism 30. Here, the one direction 80 is a direction where the power storage cells 5 are stacked. The one direction 80 may not be a direction parallel to the direction where the power storage cells 5 are stacked. The one direction 80 may be a direction intersecting with the direction where the power storage cells 5 are stacked.

The receiving member 10 includes a main body portion 11 and an expansion portion 12 projecting from the main body portion 11 toward the end plate 20 side. An inclined surface 13 is formed on the expansion portion 12, and the inclined surface 13 is provided to face a position where a restriction member 36 (particularly, an inclined portion 36t) (described later) is placed.

The load applicator 60 including the end plate 20 is placed on a first side from the power storage module 50 in the one direction 80. The end plate 70 is placed on a second side from the power storage module 50 in the one direction 80. The end plates 20, 70 have a plate shape and made of metal, for example. First end parts of the restraining tools 91, 92 are fixed to the end plate 20, and second end parts of the restraining tools 91, 92 are fixed to the end plate 70. The end plate 20 is connected to the end plate 70 via the restraining tools 91, 92.

The elastic mechanism 30 includes elastic bodies 31, 32, 33 and the restriction member 36. The elastic bodies 31, 32, 33 and the restriction member 36 are provided between the receiving member 10 and the end plate 20 in the one direction 80. The elastic bodies 31, 32, 33 may be made of elastically deformable resin, for example, and may be made of springs having various shapes such as a plate shape, a dish shape, and a helical shape. The restriction member 36 is placed adjacent to the elastic body 32, and the inclined portion 36t is provided in a distal end of the restriction member 36. The elastic mechanism 30 has a first form S1 illustrated in FIG. 1 and a second form S2 illustrated in FIG. 2.

First Form S1 and Second Form S2

In a state where the elastic mechanism 30 forms the first form S1 (FIG. 1), the elastic bodies 31, 33 of the elastic mechanism 30 contract so as to correspond to a distance D1 between the receiving member 10 and the end plate 20 in the one direction 80. In the state where the elastic mechanism 30 forms the first form S1, the elastic mechanism 30 (the elastic bodies 31, 33) applies a restraint load (arrows 71, 73) to the power storage module 50 via the receiving member 10 in accordance with the contraction amount (stroke amount) of the elastic mechanism 30, more specifically, respective contraction amounts of the elastic bodies 31, 33.

In the state where the elastic mechanism 30 forms the first form S1 (FIG. 1), the inclined portion 36t of the restriction member 36 is locked engagingly by a distal end of the elastic body 32, and the elastic body 32 is maintained by the restriction member 36 to be shorter than its own natural length (the length in an unloaded condition). The elastic body 32 forms a compressed state (a state where the elastic body 32 has an internal stress (an arrow 72) in the one direction 80). The distal end of the elastic body 32 is distanced from the expansion portion 12 of the receiving member 10, so that the internal stress (the arrow 72) does not act on the receiving member 10.

In a state where the elastic mechanism 30 forms the second form S2 (FIG. 2), the elastic body 32 is released from the engagingly locked state with the restriction member 36, and the elastic bodies 31, 32, 33 all make contact with the receiving member 10 and the end plate 20. The elastic bodies 31, 32, 33 of the elastic mechanism 30 contract so as to correspond to a distance D2 between the receiving member 10 and the end plate 20 in the one direction 80.

That is, the elastic modulus of the elastic mechanism 30 in a case where the second form S2 is formed is larger than the elastic modulus of the elastic mechanism 30 in a case where the first form S1 is formed. In the state where the elastic mechanism 30 forms the second form S2, the elastic mechanism 30 (the elastic bodies 31, 32, 33) applies a restraint load (the arrows 71, 72, 73) to the power storage module 50 via the receiving member 10 in accordance with the contraction amount of the elastic mechanism 30, more specifically, respective contraction amounts of the elastic bodies 31, 32, 33.

Figure 2:
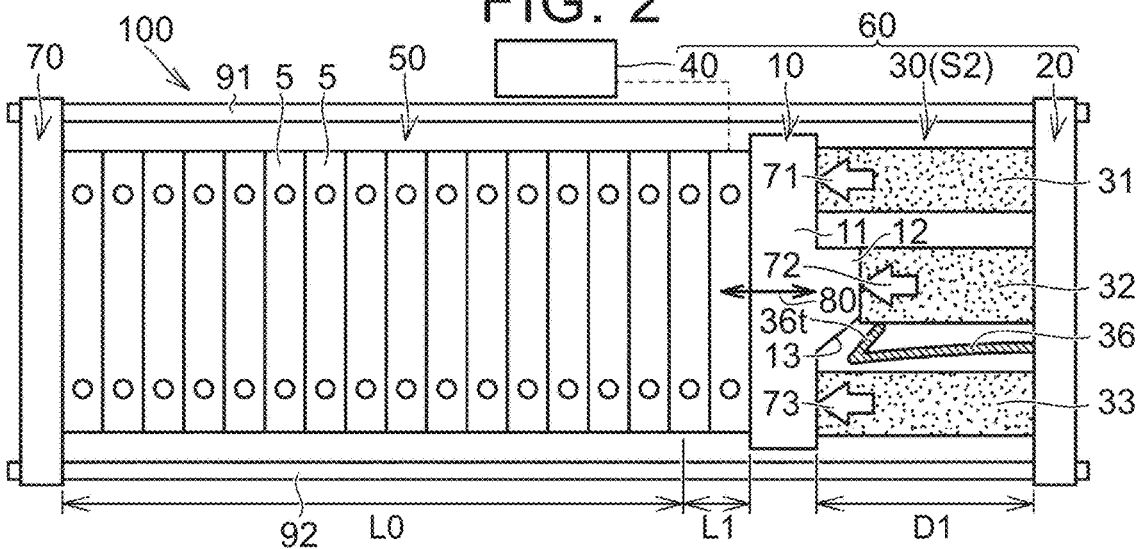
FIG. 2 is a plan view illustrating the load applicator and the power storage apparatus according to Embodiment 1 and illustrates a state where the elastic mechanism of the load applicator forms a second form.

FIG. 1 illustrates the state where the elastic mechanism 30 forms the first form S1. FIG. 2 illustrates the state where the elastic mechanism 30 forms the second form S2. The switching device 40 is configured to perform switching from the first form S1 to the second form S2. Herein, the switching device 40 includes a controlling portion, a charging circuit, and so on (not illustrated), and the switching device 40 is connected to the power storage module 50. Charging and discharging of the power storage cells 5 constituting the power storage module 50 can be performed by the switching device 40, and the state of charge (SOC) can be set to any value by the switching device 40.

Assume a case where, in a state where the SOC is set to a predetermined value, the power storage module 50 has a predetermined reference length L0 in the one direction 80. In the first form S1 (FIG. 1), in a case where the power storage module 50 expands by a first dimension L1 from the reference length L0, a first restraint load (the arrows 71, 73) is applied to the power storage module 50 by the elastic mechanism 30 of the load applicator 60.

In the second form S2 (FIG. 2), in a case where the power storage module 50 expands by the first dimension L1 from the reference length L0, a second restraint load (the arrows 71, 72, 73) is applied to the power storage module 50 by the elastic mechanism 30 of the load applicator 60. The second restraint load (the arrows 71, 72, 73) is a value larger than the first restraint load (the arrows 71, 73).

Figure 3:
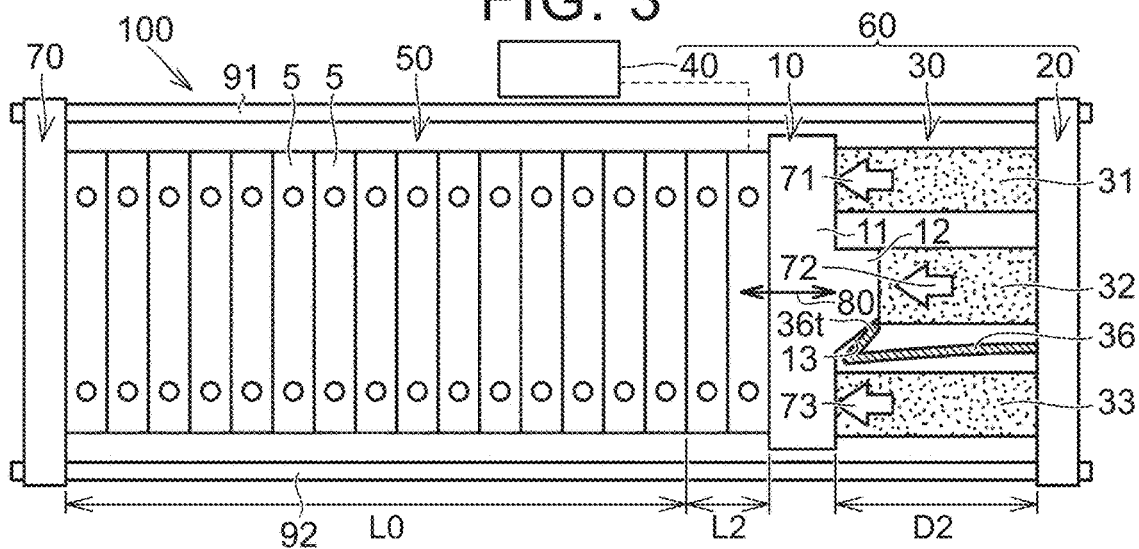
FIG. 3 is a plan view illustrating the load applicator and the power storage apparatus according to Embodiment 1 and illustrates a state where a switching device of the load applicator performs a switching operation to switch the elastic mechanism from the first form to the second form.

FIG. 3 illustrates a state where the switching device 40 of the load applicator 60 performs a switching operation to switch the elastic mechanism 30 from the first form S1 to the second form S2. For example, in a state where the switching device 40 sets respective SOC values of the power storage cells 5 constituting the power storage module 50 to values out of a predetermined range, the switching device 40 performs switching from the first form S1 to the second form S2.

In the configuration illustrated in FIG. 3, the SOC is to a value larger than a normal usage range, so that the power storage module 50 expands by a second dimension L2 from the reference length L0. The second dimension L2 is a value larger than the first dimension L1. Due to the expansion of the power storage module 50, the receiving member 10 moves in the one direction 80 more largely than in the cases illustrated in FIGS. 1, 2.

When the inclined surface 13 of the expansion portion 12 makes contact with the inclined portion 36*t* of the restriction member 36, the engagingly locked state of the restriction member 36 (the inclined portion 36*t*) with the elastic body 32 is released, so that the elastic body 32 extends. Hereby, the switching from the first form S1 to the second form S2 by the switching device 40 is completed. The restriction member 36 should keep connected to the end plate 20 so that foreign matter or abnormal noise does not occur.

Operations and Effects

As described at the beginning, when the power storage apparatus 100 or the load applicator 60 is used for a long period, there is such a possibility that the load applicator 60 cannot apply a necessary and sufficient load to the power storage module 50 due to deterioration by aging, or the like, for example. For example, the lengths of the elastic bodies 31, 33 may become shorter than their initial states under the influence of creep deformation. Alternatively, the elastic moduli (Young's moduli) of the elastic bodies 31, 33 may become smaller than their initial states under the influence of creep deformation.

Figure 4:
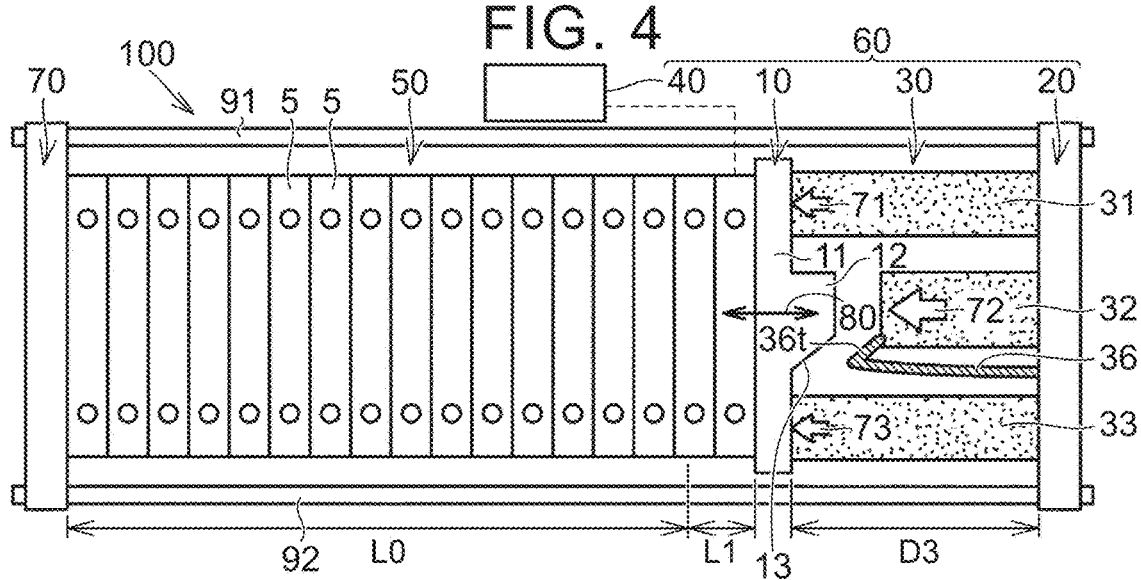
FIG. 4 is a plan view illustrating the load applicator and the power storage apparatus according to Embodiment 1 and illustrates a state where a restraint load to be applied to a power storage module by the load applicator becomes smaller than that in the case illustrated in FIG. 1.

In FIG. 4, for convenience of the description, the phenomenon as described above is expressed as the receiving member 10 becoming thin. As illustrated in FIG. 4, in a case where the phenomenon occurs, when the power storage module 50 expands by the first dimension L1 from the reference length L0, a restraint load smaller than the first restraint load (corresponding to the arrows 71, 73 in FIG. 1) is applied to the power storage module 50. In such a case, the switching device 40 is configured to perform an operation to switch from the first form S1 to the second form S2 by performing the operation described with reference to FIG. 3.

Figure 5:
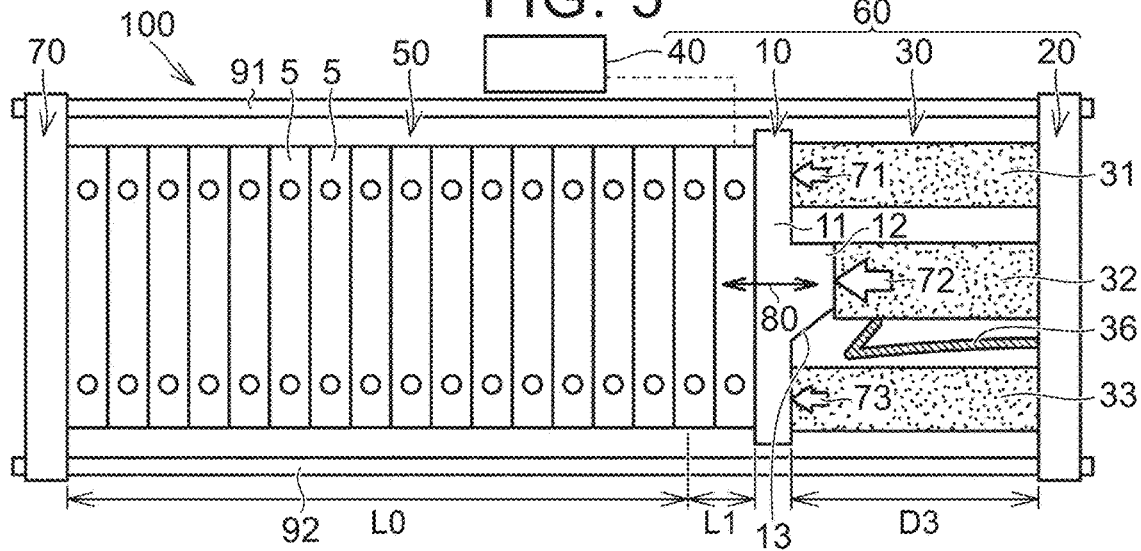
FIG. 5 is a plan view illustrating the load applicator and the power storage apparatus according to Embodiment 1 and illustrates a state where the restraint load to be applied to the power storage module by the load applicator becomes larger than that in the case illustrated in FIG. 4 due to completion of the operation to switch from the first form to the second form.

FIG. 5 illustrates a state where the restraint load to be applied to the power storage module 50 by the load applicator 60 becomes larger than that in the case illustrated in FIG. 4 due to completion of the operation to switch from the first form S1 to the second form S2. This state is a state different from the first form S1 and the second form S2 to be provided at the time of starting the use of the load applicator 60. Since this state is formed, even in a case where the power storage cells 5 constituting the power storage module 50 contract in the one direction 80, it is possible to effectively restrain insufficiency in the load to be applied from the load applicator 60 to the power storage module 50 in the one direction 80, just by an increase in the load by the elastic body 32.

Accordingly, with the above configuration, it is possible to achieve the load applicator 60 having a configuration that can apply an appropriate load to a target object for a long period as compared to the related art, and the power storage apparatus 100 including such a load applicator 60. For example, in a case where the power storage apparatus 100 (e.g., a fully solid battery) having a high capacity is formed, an elastic body such as resin can be employed or effectively utilized as a material having a higher expansion coefficient. Even in such a case, by employing the technical idea described in the present embodiment, it is possible to take measures to creep deformation of the elastic body, thereby making it possible to achieve a longer operating life of the power storage apparatus 100 as a product.

In a case where the power storage apparatus 100 is used to be provided in a vehicle, the power storage apparatus 100 can be placed at a position where its maintenance is hard to be performed in general. Even in such a case, only by performing an SOC control by the switching device 40, e.g., without a maintenance operator physically accessing the load applicator 60, it is possible to perform the operation to switch from the first form S1 to the second form S2.

The degree of creep of the elastic body can be predicted to some extent based on physical properties of the elastic body or the specification related to the load applicator 60. The switching operation is performed by the switching device 40 at a timing when the restrain load may decrease on design, and at this time, the switching operation is performed under a cell chargeable environment.

For example, a predetermined threshold may be set based on values of resistance values obtainable during charging and discharging, the integrated number of times of charging and discharging, an integrated time of charging and discharging, an operating temperature, an integrated capacity for charging and discharging, a travel distance, or the like. The arrival of the threshold may be notified (a state where an operator can recognize the arrival of the threshold may be formed), or the switching operation may be automatically performed by the switching device 40 based on the arrival of the threshold.

In the load applicator 60, the number of elastic bodies acting on the receiving member 10 increases along with changing from the first form S1 to the second form S2. That is, the elastic mechanism 30 forming the first form S1 includes a predetermined number of elastic bodies 31, 33 (herein, two elastic bodies 31, 33) configured to apply a restraint load to the power storage module 50. The elastic mechanism 30 forming the second form S2 includes three elastic bodies 31, 32, 33 the number of which is greater than the predetermined number (two), the elastic bodies being configured to apply a restraint load to the power storage module 50. Since the load applicator 60 has this configuration, it is possible to perform the operation to switch from the first form S1 to the second form S2 by an easy operation illustrated in FIG. 3.

Modification of Embodiment 1

Figure 6:
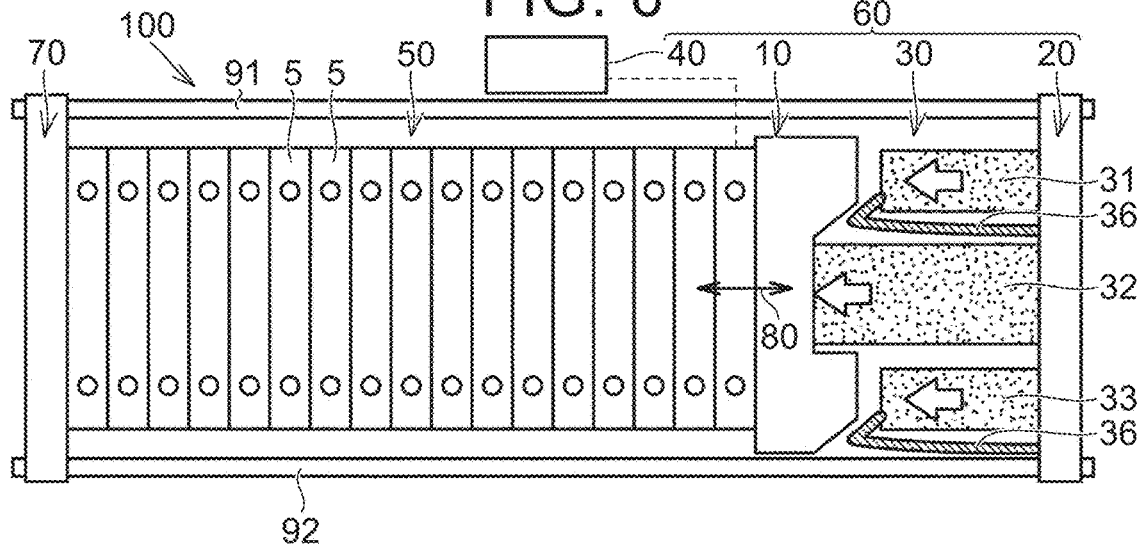
FIG. 6 is a plan view illustrating the load applicator and the power storage apparatus according to a modification of Embodiment 1.

FIG. 6 is a plan view illustrating the load applicator 60 and the power storage apparatus 100 according to a modification of Embodiment 1. In Embodiment 1 described above, by performing the operation to switch from the first form S1 to the second form S2, one elastic body 32 is added to two elastic bodies 31, 33 used to apply a restraint load to the receiving member 10.

As illustrated in FIG. 6, the load applicator 60 may be configured such that, by performing the operation to switch from the first form S1 to the second form S2, two elastic bodies 31, 33 are added to one elastic body 32 used to apply a restraint load to the receiving member 10. The number of elastic bodies and the elastic modulus of the whole elastic mechanism 30 should be designed in consideration of a restraint load to be applied to the power storage module 50.

Embodiment 2

With reference to FIGS. 7 to 9, the following describes a load applicator 61 and a power storage apparatus 101 according to Embodiment 2. FIG. 7 is a plan view illustrating the load applicator 61 and the power storage apparatus 101 and illustrates a state where the elastic mechanism 30 of the load applicator 61 forms the first form S1. FIG. 8 illustrates a state where the elastic mechanism 30 of the load applicator 61 forms the second form S2.

In the load applicator 61, the elastic mechanism 30 includes the receiving member 10, an elastic body 37, and a pedestal 38. The elastic body 37 is placed on the end plate 20 via the pedestal 38. The elastic body 37 is provided between the receiving member 10 (a movable block 14 (described later)) and the pedestal 38 in the one direction 80. The receiving member 10 includes the main body portion 11, the movable block 14, and a feed mechanism 16. An inclined surface 15 is formed on the main body portion 11, and the movable block 14 moves on the inclined surface 15.

The receiving member 10 includes a first part P1 (FIG. 7) and a second part P2 (FIG. 8). The second part P2 has a thickness thicker than that of the first part P1 in the one direction 80, and the inclined surface 15 is formed due to the presence of the first part P1 and the second part P2. In the load applicator 61, the elastic mechanism 30 has the first form S1 illustrated in FIG. 7 and the second form S2 illustrated in FIG. 8.

In a state where the elastic mechanism 30 forms the first form S1 (FIG. 7), the elastic body 37 of the elastic mechanism 30 contracts so as to correspond to the distance D1 between the receiving member 10 (the movable block 14) and the end plate 20 in the one direction 80. In the state where the elastic mechanism 30 forms the first form S1, the elastic mechanism 30 applies a restraint load (an arrow 74) to the power storage module 50 via the first part P1 of the main body portion 11 of the receiving member 10. In the state where the elastic mechanism 30 forms the first form S1, the elastic mechanism 30 (the elastic body 37) applies a restraint load (the arrow 74) to the power storage module 50 via the receiving member 10 in accordance with the contraction amount of the elastic mechanism 30, more specifically, the contraction amount of the elastic body 37.

In a state where the elastic mechanism 30 forms the second form S2 (FIG. 8), the elastic body 37 of the elastic mechanism 30 contracts so as to correspond to the distance D2 between the receiving member 10 (the movable block 14) and the end plate 20 in the one direction 80. In the state where the elastic mechanism 30 forms the second form S2, the elastic mechanism 30 applies a restraint load (an arrow 75) to the power storage module 50 via the second part P2 of the main body portion 11 of the receiving member 10. In the state where the elastic mechanism 30 forms the second form S2, the elastic mechanism 30 (the elastic body 37) applies a restraint load (the arrow 75) to the power storage module 50 via the receiving member 10 in accordance with the contraction amount of the elastic mechanism 30, more specifically, the contraction amount of the elastic body 37.

The second part P2 has a thickness thicker than that of the first part P1 in the one direction 80. Accordingly, as the whole receiving member 10, a thickness W2 of the receiving member 10 at the time when the second form S2 is formed is larger than a thickness W1 of the receiving member 10 at the time when the first form S1 is formed.

Assume a case where, in a state where the SOC is set to a predetermined value, the power storage module 50 has the predetermined reference length L0 in the one direction 80. In the first form S1 (FIG. 7), in a case where the power storage module 50 expands by the first dimension L1 from the reference length L0, a first restraint load (the arrow 74) is applied to the power storage module 50 by the elastic mechanism 30 of the load applicator 61.

In the second form S2 (FIG. 8), in a case where the power storage module 50 expands by the first dimension L1 from the reference length L0, a second restraint load (the arrow 75) is applied to the power storage module 50 by the elastic mechanism 30 of the load applicator 61. The second restraint load (the arrow 75) is a value larger than the first restraint load (the arrow 74).

FIG. 9 illustrates a state where the switching device 40 of the load applicator 61 performs a switching operation to switch the elastic mechanism 30 from the first form S1 to the second form S2. For example, in a state where the switching device 40 sets respective SOC values of the power storage cells 5 constituting the power storage module 50 to values out of a predetermined range, the switching device 40 performs switching from the first form S1 to the second form S2.

In the configuration illustrated in FIG. 9, the SOC is set to a value smaller than the normal usage range, so that the power storage module 50 expands by the second dimension L2 from the reference length L0. The second dimension L2 is a value smaller than the first dimension L1. Due to the expansion of the power storage module 50, the receiving member 10 moves in the one direction 80 by an amount smaller than that in the cases illustrated in FIGS. 7, 8.

While such a state illustrated in FIG. 9 is being formed, or when the state illustrated in FIG. 9 has been formed, the feed mechanism 16 operates such that the position of the movable block 14 is changed from the first part P1 to the second part P2. The feed mechanism 16 may be adjusted such that a load is always applied to the feed mechanism 16 by an elastic body such as a spring, and when a frictional force between the movable block 14 and the inclined surface 15 decreases, the feed mechanism 16 is pushed from the first part P1 side toward the second part P2 side. Hereby, the switching from the first form S1 to the second form S2 by the switching device 40 is completed.

As described at the beginning, when the power storage apparatus 101 or the load applicator 61 is used for a long period, there is such a possibility that the load applicator 61 cannot apply a necessary and sufficient load to the power storage module 50 due to deterioration by aging, or the like, for example. For example, the length of the elastic body 37 may become shorter than its initial state under the influence of creep deformation. Alternatively, the elastic modulus (Young's modulus) of the elastic body 37 may become smaller than its initial state under the influence of creep deformation.

In a case where such a phenomenon occurs, when the power storage module 50 expands by the first dimension L1 from the reference length L0, a restraint load smaller than the first restraint load (corresponding to the arrow 74 in FIG. 7) is applied to the power storage module 50. In such a case, the switching device 40 is configured to perform an operation to switch from the first form S1 to the second form S2 by performing the operation described with reference to FIG. 9.

When the operation to switch from the first form S1 to the second form S2 is completed, the restraint load to be applied to the power storage module 50 by the load applicator 61 increases. This state is a state different from the first form S1 and the second form S2 to be provided at the time of starting the use of the load applicator 61. Since this state is formed, even in a case where the power storage cells 5 constituting the power storage module 50 contract in the one direction 80, it is possible to effectively restrain insufficiency in the load to be applied from the load applicator 61 to the power storage module 50 in the one direction 80, just by an increase in the load by the elastic body 37.

The embodiments have been described above, but the embodiments described herein are just examples in all respects and are not limitative. The scope of this disclosure is shown by Claims and is intended to include all modifications made within the meaning and scope equivalent to Claims.

What is claimed is:

1. A load applicator for applying a restraint load to a power storage module including a plurality of power storage cells, the load applicator comprising:
    an elastic mechanism;
    a first member placed between the elastic mechanism and the power storage module in one direction, the first member being configured to move along the one direction along with contraction of the plurality of power storage cells;
    a second member provided on a side in the one direction, the side being opposite to a side where the first member is placed, across the elastic mechanism; and
    a switching device, wherein:
    the elastic mechanism contracts so as to correspond to a distance between the first member and the second member in the one direction;
    the elastic mechanism applies the restraint load to the power storage module via the first member in accordance with a contraction amount of the elastic mechanism;
    the elastic mechanism has
        a first form in which a first restraint load is applied to the power storage module when the power storage module expands by a first dimension, and
        a second form in which a second restraint load larger than the first restraint load is applied to the power storage module when the power storage module expands by the first dimension;
    the switching device is configured to perform an operation to switch from the first form to the second form in a case where the restraint load smaller than the first restraint load is applied to the power storage module when the power storage module expands by the first dimension;
    an elastic modulus of the elastic mechanism in a case where the second form is formed is larger than an elastic modulus of the elastic mechanism in a case where the first form is formed;
    the elastic mechanism forming the first form includes a predetermined number of elastic bodies configured to apply the first restraint load to the power storage module; and
    the elastic mechanism forming the second form includes elastic bodies the number of which is greater than the predetermined number to apply the second restraint load to the power storage module.

2. The load applicator according to claim 1, wherein the one direction is a direction in which the plurality of power storage cells are stacked.

3. The load applicator according to claim 1, further comprising:
    a restriction member configured to maintain at least one elastic body of the elastic bodies to be shorter than a natural length in the first form, with a space between the at least one elastic body and the first member.

4. The load applicator according to claim 3, wherein
    the restriction member includes an inclined surface facing the first member, and
    the restriction member is configured to, in response to the inclined surface receiving a direct contact from the first member, move to release an engagement between the restriction member and the at least one elastic body.

5. The load applicator according to claim 4, wherein the first member includes
a main body portion configured to directly contact a first elastic body of the elastic bodies in the first form and receive the first restraint load from the first elastic body, and
an expansion portion projecting from the main body portion toward a second elastic body being the at least one elastic body, the expansion portion having an inclined surface facing the inclined surface of the restriction member and spaced away from the second elastic body in the first form.

6. The load applicator according to claim 5, wherein the first member is configured to, in response to the switching device performing the switching from the first form to the second form, move along the one direction to
directly contact the inclined surface of the restriction member, through the inclined surface of the expansion portion, and
release the engagement between the restriction member and the second elastic body.

7. The load applicator according to claim 6, wherein the switching device is configured to change the number of elastic bodies by performing the switching from the first form to the second form.

8. The load applicator according to claim 1, wherein the switching device is configured to change the number of elastic bodies by performing the switching from the first form to the second form.

9. A power storage apparatus comprising:
a power storage module including a plurality of power storage cells; and
the load applicator according to claim 1, wherein, the switching device is configured to, in a state where respective state of charge (SOC) values of the plurality of power storage cells constituting the power storage module are set to values out of a predetermined range, perform switching from the first form to the second form.

10. A load applicator for applying a restraint load to a power storage module including a plurality of power storage cells, the load applicator comprising:
an elastic mechanism;
a first member placed between the elastic mechanism and the power storage module in one direction, the first member being configured to move along the one direction along with contraction of the plurality of power storage cells;
a second member provided on a second side in the one direction, the second side being opposite to a first side, where the first member is placed, with respect to the elastic mechanism; and
a switching device, wherein:
the elastic mechanism is configured to contract so as to correspond to a distance between the first member and the second member in the one direction;
the elastic mechanism is configured to apply the restraint load to the power storage module via the first member in accordance with a contraction amount of the elastic mechanism;
the elastic mechanism has
a first form in which a first restraint load is applied to the power storage module in response to the power storage module expanding by a first dimension, and
a second form in which a second restraint load larger than the first restraint load is applied to the power storage module in response to the power storage module expanding by the first dimension;
the switching device is configured to, in response to the restraint load smaller than the first restraint load being applied to the power storage module when the power storage module expands by the first dimension, perform an operation to switch from the first form to the second form;
the first member includes
a first part, and
a second part having a thickness thicker than a thickness of the first part in the one direction;
the elastic mechanism is configured to,
in a state where the elastic mechanism is in the first form, apply the first restraint load to the power storage module via the first part of the first member; and
in a state where the elastic mechanism is in the second form, apply the second restraint load to the power storage module via the second part of the first member,
a movable block is arranged on the first member, urged toward the second part in a direction crossing the one direction, and configured to, in response to a frictional force decreasing between the movable block and the first member, move toward the second part, and
a pedestal is connected to the movable block through the elastic mechanism and configured to move along a surface of the second member with the movable block.

11. The load applicator according to claim 10, wherein a surface of the first part and a surface of the second part define an inclined surface of the first member, and
the movable block is configured to, in response to the frictional force decreasing between the movable block and the inclined surface, move toward the second part.

* * * * *